US008293135B2

(12) United States Patent
Cox et al.

(10) Patent No.: US 8,293,135 B2
(45) Date of Patent: Oct. 23, 2012

(54) PCLC FLAKE-BASED APPARATUS AND METHOD

(75) Inventors: Gerald P. Cox, Brockport, NY (US); Cathy A. Fromen, Raleigh, NC (US); Kenneth L. Marshall, Rochester, NY (US); Stephen D. Jacobs, Pittsford, NY (US)

(73) Assignee: University of Rochester, Rochester, NY (US)

( * ) Notice: Subject to any disclaimer, the term of this patent is extended or adjusted under 35 U.S.C. 154(b) by 153 days.

(21) Appl. No.: 12/840,474

(22) Filed: Jul. 21, 2010

(65) Prior Publication Data

US 2012/0019738 A1    Jan. 26, 2012

(51) Int. Cl.
*C09K 19/02* (2006.01)
*C09K 19/54* (2006.01)
*G02F 1/133* (2006.01)
*G02F 1/1334* (2006.01)

(52) U.S. Cl. ......... 252/299.5; 349/36; 349/86; 349/115; 349/116; 349/183; 349/185; 359/296; 359/321

(58) Field of Classification Search ............... 252/299.5; 349/36, 86, 115, 116, 183, 185; 359/296, 359/321
See application file for complete search history.

(56) References Cited

U.S. PATENT DOCUMENTS

| 6,665,042 B1 | 12/2003 | Marshall et al. |
| 6,829,075 B1 | 12/2004 | Kosc et al. |
| 7,042,617 B2 | 5/2006 | Kosc et al. |
| 7,238,316 B2 | 7/2007 | Trajkovska-Petkoska et al. |
| 2004/0233508 A1* | 11/2004 | Kosc et al. ..................... 359/296 |

OTHER PUBLICATIONS

Kosc et al.; Progress in the Development of Polymer Cholesteric Liquid Crystal Flakes for Display Applications; Displays, 25, (Elsevier 2004), 171-176.
Marshall et al.; Doped Multilayer Polymer Cholesteric-Liquid-Crystal (PCLC) Flakes: A Novel Electro-Optical Medium for Highly Reflective Color Flexible Displays; Laboratory for Laser Energetics, University of Rochester, 250 East River Road, Rochester, NY 14623-1299.
Marshall et al.; Polymer Cholesteric-Liquid-Crystal (PCLC) Flake/Fluid Host Electro-Optical Suspensions and their Applications in Color Flexible Reflective Displays; Laboratory for Laser Energetics, Materials Science Program, Department of Chemical Engineering, and the Institute of Optics, University of Rochester, Rochester, NY 14623-1299.

(Continued)

*Primary Examiner* — Shean Wu
(74) *Attorney, Agent, or Firm* — William Greener; Bond, Schoeneck & King, PLLC

(57) ABSTRACT

A PCLC flake/fluid host suspension that enables dual-frequency, reverse drive reorientation and relaxation of the PCLC flakes is composed of a fluid host that is a mixture of: 94 to 99.5 wt % of a non-aqueous fluid medium having a dielectric constant value $\in$, where $1<\in<7$, a conductivity value σ, where $10^{-9}>\sigma>10^{-7}$ Siemens per meter (S/m), and a resistivity r, where $10^7>r>10^{10}$ ohm-meters (Ω-m), and which is optically transparent in a selected wavelength range Δλ; 0.0025 to 0.25 wt % of an inorganic chloride salt; 0.0475 to 4.75 wt % water; and 0.25 to 2 wt % of an anionic surfactant; and 1 to 5 wt % of PCLC flakes suspended in the fluid host mixture. Various encapsulation forms and methods are disclosed including a Basic test cell, a Microwell, a Microcube, Direct encapsulation (I), Direct encapsulation (II), and Coacervation encapsulation. Applications to display devices are disclosed.

54 Claims, 9 Drawing Sheets

OTHER PUBLICATIONS

Marshall et al.; Polymer Cholesteric-Liquid-Crystal (PCLC) Flake/Fluid Host Electro-Optical Suspensions: Progress Toward Flexible Reflective Displays; USDC Flexible Displays and Microelectronics Conference, Phoenix, Arizona, Feb. 6-9, 2006.

Marshall et al.; Polymer Cholesteric-Liquid-Crystal (PCLC) Flake/Fluid Host Suspensions: A Novel Electro-Optical Medium for Reflective Color Display Applications; Laboratory for Laser Energetics, Department of Chemical Engineering, and Institute of Optics, University of Rochester, 250 East River Road, Rochester, NY 14623.

Kosc et al.; Inhomogeneous Doping of PCLC Flakes with CB or SWNT Produces Multimode Motion in an Applied Electric Field; Laboratory for Laser Energetics, University of Rochester.

Ryan Burakowski; PCLC Flakes for OMEGA Laser Applications; Churchville-Chili High School, Churchville, NY; Laboratory for Laser Energetics, University of Rochester, Rochester, NY, 1-19.

Trajkovska-Petkoska et al.; Enhanced Electro-Optic Behavior for Shaped Polymer Cholesteric Liquid-Crystal Flakes Made Using Soft Lithography; Advanced Functional Materials, 2005, 15, No. 2, Feb. 2005, 217-222.

Kosc et al.; Electric-Field-Induced Motion of Polymer Cholesteric Liquid-Crystal Flakes in a Moderately Conductive Fluid; Applied Optics; vol. 41, No. 25, Sep. 1, 2002, 5362-5366.

Kosc et al.; Progess in the Development of Polymer Cholesteric Liquid Crystal Flakes for Display Applications; Displays, 25, (Elsevier 2004), 171-176.

Marshall et al.; Doped Multilayer Polymer Cholesteric-Liquid-Crystal (PCLC) Flakes: A Novel Electro-Optical Medium for Highly Reflective Color Flexible Displays; Laboratory for Laser Energetics, University of Rochester, 250 East River Road, Rochester, NY 14623-1299; Society for Information Display, San Jose, CA, 2007.

Trajkovska-Petkoska et al; Motion of Doped-Polymer-Cholesteric Liquid Crystal Flakes in a Direct-Current Electric Field; Journal of Applied Physics, 103, 094907, 2008, American Institute of Physics, 1-4.

Kosc et al.; Polymer Cholesteric Liquid-Crystal Flake Reorientation in an Alternating-Current Electric Field; Journal of Applied Physics, 98, 013509, 2005, American Institute of Physics, 1-6.

Marshall et al.; Polymer Cholesteric-Liquid-Crystal (PCLC) Flake/Fluid Host Electro-Optical Suspensions and their Applications in Color Flexible Reflective Displays; Laboratory for Laser Energetics, Materials Science Program, Department of Chemical Engineering, and the Institute of Optics, University of Rochester, Rochester, NY 14623-1299; Society for Information Display, Hsinchu, Taiwan 2007.

Marshall et al.; Polymer Cholesteric-Liquid-Crystal (PCLC) Flake/Fluid Host Electro-Optical Suspensions and Their Applications in Color Flexible Reflective Displays; USDC Flexible Microelectronics and Displays Conference, Phoenix, Arizona, Feb. 1-3, 2005.

Marshall et al.; Polymer Cholesteric-Liquid-Crystal (PCLC) Flake/Fluid Host Electro-Optical Suspensions: Progress Toward Flexible Reflective Displays; USDC Flexible Displays and Microelectronics Conference, Pheonix, Arizone, Feb. 6-9, 2006.

Marshall et al.; Polymer Cholesteric-Liquid-Crystal (PCLC) Flake/Fluid Host Suspensions: A Novel Electro-Optical Medium for Reflective Color Display Applications; Laboratory for Laser Energetics, Department of Chemical Engineering, and Institute of Optics, University of Rochester, 250 East River Road, Rochester, NY 14623; Society for Information Display, San Jose, CA, 2005.

Marshall et al.; Doped Multilayer Polymer Cholesteric-Liquid-Crystal (PCLC) Flakes: A Novel Electro-Optical Medium for Highly Reflective Color Flexible Displays; SID 2007 Symposium, Long Beach, CA, May 20-25, 2007.

Kosc et al.; Optical Engineering; Development of Polymer Cholesteric-Liquid-Crystal Flakes for Electro-Optic Applications; Optics & Photonics News, Dec. 2004, 33.

Tanya Z. Kosc; Particle Display Technologies Become E-Paper; Optics & Photonics news; Feb. 2005, 18-23.

Kosc et al.; Inhomogeneous Doping of PCLC Flakes with CB or SWNT Produces Multimode Motion in an Applied Electric Field; Laboratory for Laser Energetics, University of Rochester; Society for Information Display, Hsinchu, Taiwan 2007.

Ryan Burakowski; PCLC Flakes for OMEGA Laser Applications; Churchville-Chili High School, Churchville, NY; Laboratory for Laser Energetics, University of Rochester, Rochester, NY, 1-19; 2006.

* cited by examiner (a) Coacervation encapsulation test cell (b) Cross-section of Coacervation encapsulation (c) Finite element mesh of Coacervation encapsulation

PCLC FLAKE-BASED APPARATUS AND METHOD

FEDERALLY SPONSORED RESEARCH

Embodiments of the invention were made with government support under Cooperative Agreement No. DE-FC52-08NH28 sponsored by the U.S. Department of Energy. The government has certain rights in the invention.

RELATED APPLICATION DATA

N/A.

BACKGROUND

1. Field of the Invention

Embodiments of the invention are most generally related to the field of liquid crystals. More particularly, embodiments of the invention are directed to PCLC flake-based apparatus and methods and, even more particularly, to PCLC flake/host fluid suspensions enabling dual-frequency, reverse drive apparatus and methods, and to flake/fluid suspension encapsulation structures, methods, and applications.

2. Related Art

U.S. Pat. Nos. 6,665,042, 6,829,075, 7,042,617, and 7,238,316, all of which are commonly assigned to the assignee of the instant application, disclose and teach polymer liquid crystal (PLC)-based devices and methods, as well as manufacturing methods for flakes themselves. More particularly, the referenced patents disclose enabling details in regard to flake/fluid host suspensions, electronically addressable and switchable devices comprising the flake/fluid suspensions, flake/fluid suspension encapsulation formulations and techniques, doped flakes and methods for making and/or doping the flakes, as well as other related apparatus and methods. The subject matter of these patents are incorporated by reference herein in their entireties to the fullest extent allowed by applicable rules and laws.

Kosc et al., Polymer cholesteric liquid-crystal flake reorientation in an alternating-current electric field, JOURNAL OF APPLIED PHYSICS 98, 013509 (2005); Trajkovska-Petkoska et al., Enhanced Electro-Optic Behavior for Shaped Polymer Cholesteric Liquid-Crystal Flakes Made Using Soft Lithography, ADV. FUNCT. MATER., 15, No. 2, (2005); and, Cox et al., Modeling the effects of microencapsulation on the electro-optic behavior of polymer cholesteric liquid crystal flakes, JOURNAL OF APPLIED PHYSICS 106, 124911 (2009), further describe relevant background, teachings, and applications related to the embodied technology described herein. The subject matter of these publications are incorporated by reference herein in their entireties to the fullest extent allowed by applicable rules and laws.

Previous PCLC flake research has focused on manipulating flake motion with an AC or DC electric field. The flakes have been made to translate, reorient parallel with the electric field (to a non-reflective orientation from their original reflective orientation as suspended in a host medium), or display chaotic motion depending on the system conditions. Work has also been conducted on various host fluids having different dielectric properties as well as the effects of changing the dielectric properties of the PCLC flakes by doping. The different system combinations compatible with Maxwell-Wagner interfacial polarization reorientation have used various factors to adjust the speed of PCLC flake reorientation parallel with the electric field.

FIG. 1 shows an illustration of torques acting on a PCLC flake in an electro-optic test cell when the flake density is greater than that of fluid. As illustrated in FIG. 1a, when an electric field is applied, an electrostatic torque $\Gamma_E$ acts to orient the flake in line with the electric field E and the torques due to gravity, $\Gamma_G$, and hydrodynamic drag, $\Gamma_H$, resist. FIG. 1b illustrates that when the electric field is turned off, the torque due to gravity $\Gamma_G$ acts to re-orient the flake. Thus gravity must be relied upon to relax the flake back to its original, reflective orientation. Relaxation times of six to greater than 60 seconds have been observed, depending on the density differences between the flake and host fluid as well as flake dimensions, the viscosity of the host fluid, and other reported factors. Further, if the host medium/flake enclosure is not oriented perpendicular to gravity, the flakes may not relax to a full reflective position.

PCLC flake technology offers unique features and benefits for a number of applications including, but not limited to, switchable/tunable color filters, micropolarizers, and modulators in the fields of electro-optics and photonics; switchable paints, conformal coatings, and switchable smart windows for energy or privacy control in the coatings field; anti-counterfeiting, signature reduction, camouflage, encoded and encrypted information storage for military and security applications; and perhaps most predominantly, for reflective multicolor particle displays, electronic paper, flexible displays, and 3-D displays. Several attributes that make this technology attractive for information display devices include the highly saturated color obtainable through PCLC selective reflection at low flake concentration (3-5%) without polarizers or filters, response times on the order of hundreds of milliseconds, remarkably low drive voltage requirements (mV/μm), flake encapsulation capability, and others.

Therefore, it would be advantageous to provide an active, controllable reverse drive mechanism to relax or reorient the PCLC flakes back to their original reflective orientation after their active orientation to a non-reflective state in order for PCLC flake-based technology to reach its full potential in the field of reflective display.

Non-limiting, illustrative, and exemplary embodiments and aspects of the invention are disclosed below.

SUMMARY

An embodiment of the invention is a PCLC flake/fluid host suspension having utility for use at least in an electronic information display device. The suspension comprises a fluid host that is a mixture of 94 to 99.5 wt % of a non-aqueous, insulating fluid medium having a dielectric constant value ∈, where 1<∈<7, a conductivity value σ, where $10^{-9}$>σ>$10^{-7}$ Siemens per meter (S/m), and a resistivity r, where $10^7$>r>$10^{10}$ ohm-meters (Ω-m), and which is optically transparent in a selected wavelength range Δλ; 0.0025 to 0.25 wt % of an inorganic chloride salt; 0.0475 to 4.75 wt % water (e.g., distilled or DI water); and 0.25 to 2 wt % of a cationic surfactant; and 1 to 5 wt % of PCLC flakes suspended in the fluid host mixture. According to an aspect, the fluid host is a silicone oil. In a particular, non-limiting aspect, the fluid host is a polydimethysiloxane fluid known as SIT7757 having a dielectric constant ∈=2.7. According to an aspect, the fluid host is transparent in a selected visible wavelength range or a selected infra-red wavelength range. In various aspects, the chloride salt is selected from a group consisting of NaCl, KCl, LiCl, and other chloride salts selected from Groups IA, IIA, IB, IIB, IIIB, IVB, VB VIB, VII and VIIB of the Periodic table of the elements. In various aspects, the PCLC flakes each have a top surface and a bottom surface, which are each characterized by a surface dimension aspect ratio of at least 1:1 (e.g., 2:1, 3:1, 4:1), and each flake has a thickness between about two microns (μ) to 10μ. The PCLC flakes may have a regular surface geometry (e.g., circular, square, rectangular, etc.) or an irregular surface geometry, and need not be uniform amongst the plurality of flakes. In various aspects, the PCLC flakes may be pure, undoped PCLC flakes (neat) or they may be doped to have a dielectric constant value $1<\in<7$ and a conductivity value $10^{-9}>\sigma>10^{-7}$ (S/m). In a non-limiting aspect, at least some of the PCLC flakes may be layered flakes comprising two flakes disposed in surface-to-surface contact. The layered flakes may include an intermediate optical stop layer (e.g., carbon black). For a layered flake, one may be left-hand circularly polarized and the other, right-hand circularly polarized, or of the same polarization-handedness and separated by an optical half-wave medium. In a particular aspect, the fluid host is a mixture of 98.5 wt % of SIT7757 fluid; 0.025 wt % inorganic chloride salt; 0.475 wt % water; and 1 wt % aerosol-OT surfactant. In a non-limiting aspect, the inorganic chloride salt is NaCl.

An embodiment of the invention is a polymer cholesteric liquid crystal (PCLC)-based system. Such system may be, but is not limited to, an electronic particle display device or component thereof. The system may comprise an enclosure (also referred to herein as 'encapsulation') having two opposing surfaces wherein at least one of the surfaces is optically transparent over a selected wavelength range and, a suspension disposed in the enclosure, wherein the suspension comprises a fluid host that is a mixture of 94 to 99.5 wt % of a non-aqueous fluid medium having a dielectric constant value $\in$, where $1<\in<7$, a conductivity value σ, where $10^{-9}>\sigma>10^{-7}$ Siemens per meter (S/m), and a resistivity r, where $10^7>r>10^{10}$ ohm-meters (Ω-m), and which is optically transparent in the selected wavelength range; 0.0025 to 0.25 wt % of an inorganic chloride salt dissolved in water; and 0.25 to 2 wt % of an anionic surfactant; and 1 to 5 wt % of PCLC flakes suspended in the fluid host mixture. In an aspect, the enclosure surfaces have an electrically conductive coating in contact with the suspension, and the system further includes a frequency modulated voltage source connected to the conductive coating. The enclosure, depending upon its geometry, has a gap thickness that is sufficient to accommodate the dimensions of an at least partially-rotated PCLC flake. In various aspects, the enclosure has a gap thickness between about 50 to 250μ. According to various non-limiting aspects, the flake/fluid host suspension is as described in the immediately preceding paragraph. According to an aspect, the enclosure surfaces may be flexible; e.g., the enclosure (encapsulation) may be a polymer film, wherein the suspension is in an emulsified form encapsulated therein; thus, the PCLC flake/fluid suspension may be encapsulated within a polymer binder and cast as a film onto a substrate.

An embodiment of the invention is a polymer cholesteric liquid crystal (PCLC)-based system that includes a flake/fluid host suspension as described above and a discrete, optically transparent, shell or capsule (also referred to herein as micro-capsule or microencapsulation) in which the suspension is totally encapsulated. The shell or capsule may be a polymer binder or, alternatively, the shell or capsule may be a gelatin medium. In an aspect, the system further includes an enclosure having two opposing surfaces wherein at least one of the surfaces is optically transparent over a selected wavelength range, and the shell or capsule is disposed between the surfaces. In an aspect, the enclosure surfaces have an electrically conductive coating, which serves as electrodes. According to an aspect, the system includes an enclosure having two opposing surfaces wherein at least one of the surfaces is optically transparent over a selected wavelength range, wherein the enclosure surfaces have an electrically conductive coating, and further including a polymer binder disposed between the surfaces, wherein the micro-encapsulated suspension is disposed in the binder. According to an aspect, encapsulation of the flake/fluid suspension, further referred to herein as 'complex coacervation,' pertains to a polymer film-forming binder that includes discrete shells or capsules (microcapsules) containing the flake/fluid suspension described above, dispersed therein.

An embodiment of the invention is a method for driving a PCLC flake in at least two opposite directions (e.g., driving the flake(s) from an initial, selectively-optically reflecting orientation when no electric field is present (OFF state) to an essentially non-reflecting orientation (e.g., through an angle of greater than zero up to 90° when an electric field is applied (ON state), referred to herein as 'orientation,' and then from the non-reflecting orientation back to the optically reflecting orientation, referred to herein as 'relaxation'). The method includes the steps of applying an AC voltage in a first frequency range to a flake/host fluid suspension disposed in an enclosure, wherein the suspension further comprises a fluid host that is a mixture of 94 to 99.5 wt % of a non-aqueous fluid medium having a dielectric constant value $\in$, where $1<\in<7$, a conductivity value σ, where $10^{-9}>\sigma>10^{-7}$ Siemens per meter (S/m), and a resistivity r, where $10^7>r>10^{10}$ ohm-meters (Ω-m), and which is optically transparent in a selected wavelength range $\Delta\lambda$; 0.0025 to 0.25 wt % of an inorganic chloride salt; 0.0475 to 4.75 wt % water; and 0.25 to 2 wt % of an anionic surfactant; and 1 to 5 wt % of PCLC flakes suspended in the fluid host mixture, to rotate the PCLC flakes in a first direction and thus orient the PCLC flakes in a first orientation that is different than an initial, unrotated orientation; and applying an AC voltage in a second frequency range to the solution to rotate the PCLC flakes in a second direction that is opposite to the first direction and thus orient the PCLC flakes in a second orientation that is different than the first orientation. According to an aspect, the second orientation is the initial orientation. According to an aspect, the AC voltage is in the range of between about 50 millivolts per micron (mV/μ) of enclosure gap thickness or other defined enclosure parameter to about 350 mV/μ. According to an aspect, the frequency is in the range of between 0.1 to 300 cycles per second (Hz). In a particular non-limiting, exemplary aspect, the voltage is applied at a first frequency of approximately 5 Hz or less to actively orient the PCLC flakes and the voltage is applied at a second frequency of approximately 5 Hz or greater to actively relax the PCLC flakes. In a particular non-limiting, exemplary aspect, the voltage is applied at a first frequency of approximately 40 Hz or less to actively orient the PCLC flakes and the voltage is applied at a second frequency of approximately 40 Hz or greater to actively relax the PCLC flakes.

More precisely, the term 'turnover frequency' will be used herein to indicate the drive voltage frequency or frequency range at or over which the flake orientation actively switches between 'parallel to' and 'perpendicular to' the applied electric field. One of the factors influencing the turnover frequency is the structural parameters of the enclosure, which, in work performed by the inventors includes enclosures referred to as a) basic cell, b) microwell, c) microcube, d) direct encapsulation I, e) direct encapsulation II, and f) coacervation encapsulation. These terms will be described in further detail below.

The inventors have recognized that for PCLC flakes to achieve their potential in many reversibly-switchable particle device applications, high volume, low cost manufacturing techniques such as roll-to-roll processing will advantageously be developed with the use of microencapsulation. Microencapsulation as it is applied to PCLC flakes and as that term is used herein can be defined as suspending the PCLC flakes in a host fluid and encapsulating this suspension on a microscopic scale within an optically transparent shell (microcapsule; a plurality of microcapsules). Microencapsulation is advantageous to prevent flake migration or agglomeration, and to allow application of the flake/fluid host suspension to any appropriate surface (e.g., rigid, flexible or curved). Microencapsulation of the PCLC flake/fluid host suspension allows the microcapsules themselves to be dispersed in a flexible polymer binder and cast or otherwise coated onto a rigid or flexible substrate by a number of means, including knife coating, die coating, roll coating, and printing via ink-jet techniques.

Additional features and advantages of the invention will be set forth in the detailed description which follows, and in part will be readily apparent to those skilled in the art from that description or recognized by practicing the invention as described herein, including the claims as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF EXEMPLARY EMBODIMENTS OF THE INVENTION

Figure 1:
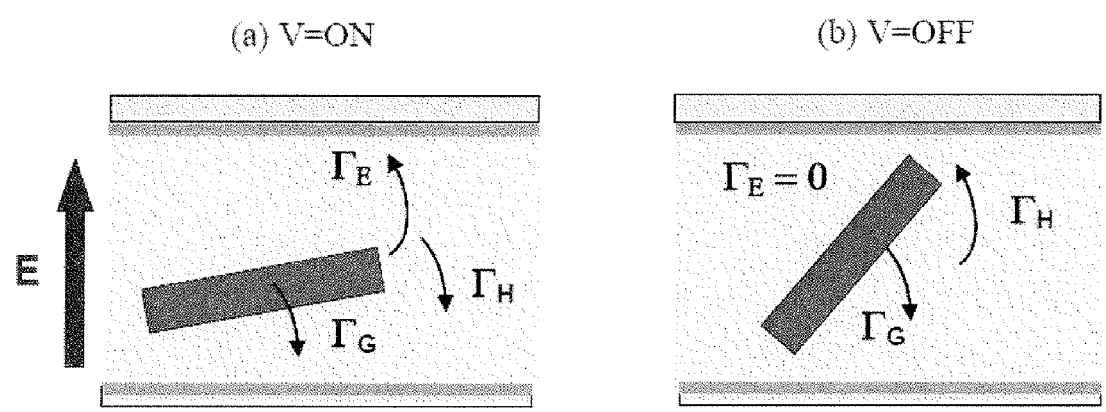
FIG. 1 shows an illustration of torques acting on a PCLC flake in an electro optic test cell when the flake density is greater than that of fluid; (a) when an electric field is applied, an electrostatic torque acts to orient the flake in line with the electric field and the torques due to gravity and hydrodynamic drag resist; (b) when the electric field is turned off, the torque due to gravity acts to reorient the flake and hydrodynamic drag resists.

PCLC flakes suspended in a low dielectric constant host fluid doped with an aqueous salt solution and a surfactant can be actively oriented (reflecting to non-reflecting orientation) and actively re-oriented, i.e., relaxed (non-reflecting to reflecting orientation), in an AC electric field. The flake/host fluid suspension according to embodiments and aspects of the invention disclosed and claimed herein exhibits dual-frequency response enabling a reverse drive mechanism for PCLC flakes. Below a 'turnover frequency,' the flakes align parallel to the electric field (non-reflective orientation) and above the turnover frequency the flakes align perpendicular to the electric field (reflective orientation).

The enablement of a reverse drive mechanism brings closer the realization of thin, flexible, lightweight, low cost, environmentally robust reflective particle display devices that require no backlight when ambient light is available, while operating at low power consumption. The capability for full color display, high reflectivity, low power consumption, and bright, saturated colors without the use of color filters or polarizers further enables the application of PCLC flake-based apparatus to electronic paper, handheld devices, wireless updatable labels, billboards, wearable displays, and others.

Embodiments and aspect of the invention described and claimed herein are relatedly directed to encapsulated forms of the flake/fluid suspension as well as encapsulation methods. The disclosed forms and methods provide the capabilities to realize the device and use applications referred to herein above.

As known from the references cited in the Background section above, as well as other published sources known in the art, PCLC flakes are micrometer scale platelets of PCLC material either generated by freeze fracturing of molecularly well-aligned, environmentally robust macroscopic PCLC films or formed in controlled shapes and sizes by means of a number of photolithographic, molding, or stamping techniques. Both processes rely on shear stress applied to the PCLC material surface during film or particle formation to align the cholesteric helical structure normal to the film surface. The unique temperature stability, circular polarization and selective wavelength reflection of the parent films are preserved during the flake manufacturing process. PCLC flakes display a Bragg-like (selective) reflection effect, where incident light of a specific wavelength and (circular) polarization component is strongly reflected from the flake to produce highly saturated, circularly polarized colors. Selective reflection occurs when the wavelength, $\lambda$, of incident light satisfies the condition $\lambda = nP$ (where n and P are the average refractive index of the nematic substructure and the helical pitch length, respectively, of the PCLC material). This "selective reflection" is due to the helical structure inherent to the PCLC material and can be designed to reflect either left- or right-handed circularly polarized light depending on the molecular structure of the PCLC polymers from which they are comprised. The individual color states depend on the flake's helical pitch length, which may be tuned from the deep UV (nm scale) to the IR ($\mu$m scale) region, including the entire visible spectrum.

Figure 2:
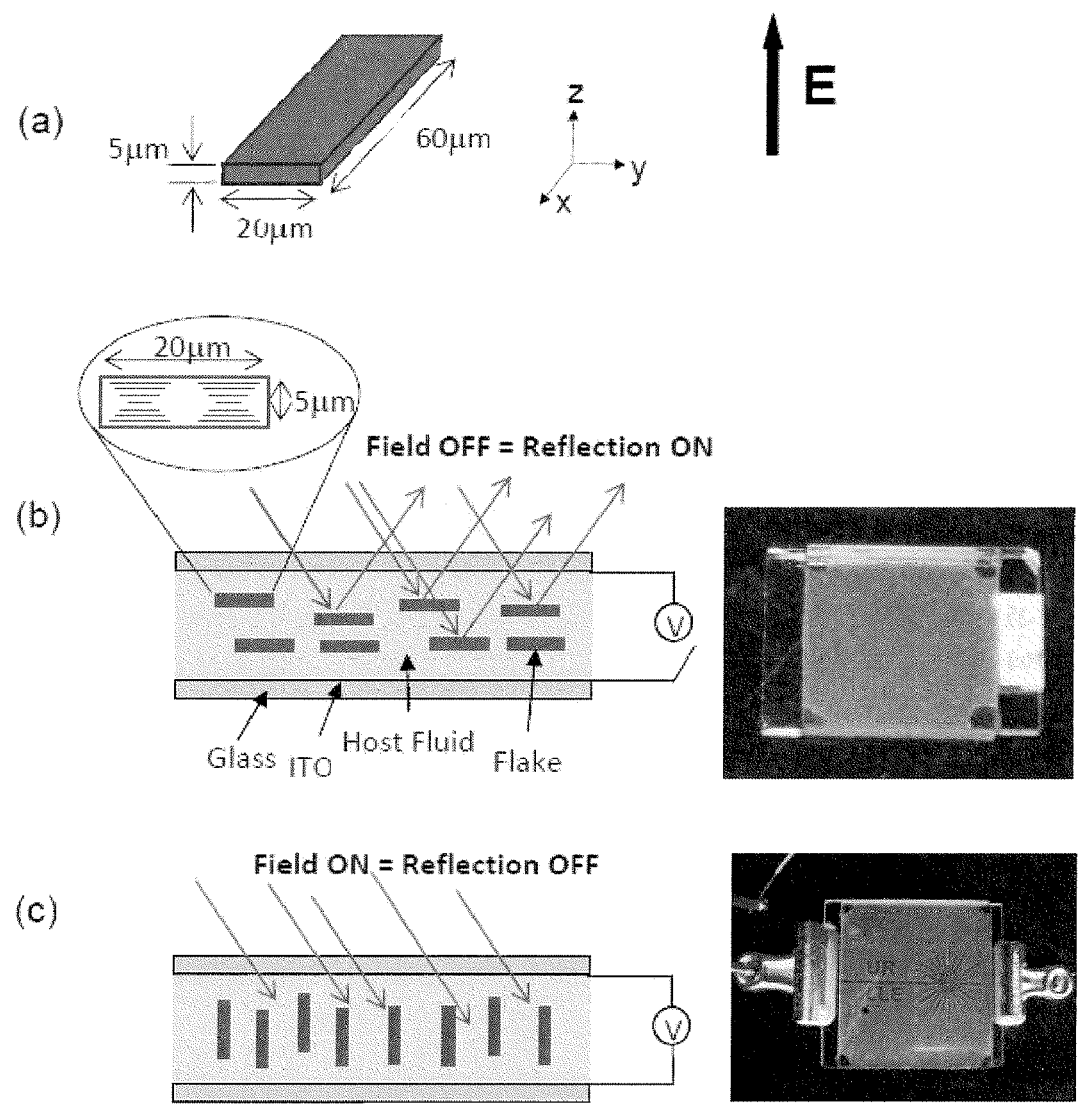
FIG. 2 shows (a) dimensions of a shaped PCLC flake; (b) flakes oriented approximately parallel to the cell substrates when no electric field is applied and appearing colored as a result of selective reflection; (c) flakes reoriented parallel to the applied field, which appear dark due to the light being absorbed by the back plane of the test cell.

Kosc et al. were the first to investigate the switchable behavior of PCLC flakes in an applied electric field. When flakes in an appropriate host fluid are subjected to an AC electric field, electro-orientation (flake reorientation) results due to Maxwell-Wagner (MW) interfacial polarization. Charges accumulate at the interface of the flake and the fluid, inducing a dipole on the flake. The applied electric field then acts on that dipole to reorient the flake parallel to the electric field. Interfacial polarization is driven by the difference between the flake and host fluid dielectric properties. Devices containing these "polarizing pigments" suspended in a commodity dielectric host fluid (e.g., silicone oil) at concentrations ranging from 3 to 5 wt % switch rapidly (<1 s) at very low voltages (10 to 100 mV$_{rms}$/$\mu$m). FIG. 2 shows the electric field-induced behavior of a PCLC flake/host fluid suspension in a typical, sandwich-cell geometry. FIG. 2(a) indicates the dimensions of neat, rectangular shaped, 3:1 aspect ratio polysiloxane PCLC flakes used for the majority of the reported work. With no field applied, the flakes lie nearly parallel to the substrates and selectively reflect one circularly polarized component of the incident light, illustrated in FIG. 2(b). An electric field applied to patterned electrodes produces flake reorientation by MW polarization and extinguishes the selective reflection color exposing the black back plane of the device, as shown in FIG. 2(c). The angle of rotation can range from ~1° to 90° depending on the dielectric constant and conductivity of both the flakes and the fluid host; 15 degrees of rotation is often sufficient to extinguish the reflectivity.

Trajkovska-Petkoska et al. extended Kosc's work to shaped flakes, layered flakes and doped flakes. Uniformly shaped flakes lead to more uniform reorientation times in an applied electric field. When the difference between host and flake conductivities is increased by doping, faster reorientation times and translational motion in a DC regime are observed. When the dopant is not uniformly distributed throughout the particle however, a combination of translational and rotational motion is observed. With moderately conductive hosts, 90 degree orientation is observed in the DC regime. Trajkovska-Petkoska also expanded upon the original reorientation time model developed by Kosc, including a gravity term for modeling flake relaxation times upon removal of the electric field.

An embodiment of the invention is directed to a dual-frequency, reverse-drive mechanism for PCLC flakes reoriented by Maxwell-Wagner polarization. Aspects of the embodiment include a method for doping a host fluid and a novel flake/host fluid suspension.

Both AC and DC electric fields have been employed to manipulate flake motion in a flake/fluid suspension. The flakes have been shown to translate, reorient parallel with the electric field, or display chaotic motion depending on the system conditions. Reorientation has been shown to depend, at least in part, on host fluids with different dielectric properties as well as the effects of changing the dielectric properties of the PCLC flakes by doping. Different system combinations compatible with MW reorientation have used various factors to adjust the speed of PCLC flake reorientation parallel with the electric field. As shown in FIG. 1, in order for the flakes to return to their original orientation, gravity must be counted on to 'relax' the flake back into a reflective position. Relaxation times vary (6 to >60 s) depending on the density differences between the flake and host fluid as well as the viscosity of the host fluid. If the display is not oriented perpendicular to gravity, the flakes may not relax to a full reflective position. Therefore, in order for PCLC flakes to reach their full potential as part of a reflective display technology using MW reorientation, a reverse drive mechanism will be advantageous to reorient the PCLC flakes to their original reflective orientation.

Current electronic particle display devices generally employ low dielectric constant fluid components that take advantage of low drive currents for operation, and state of the art control systems are built around this fact. Higher drive currents lead to short battery life, and electronic paper displays are assumed to have extended battery life because of low power requirements. For PCLC flake technology to be accepted for commercial applications it is desirable to have low current draw across the display cell.

According to an exemplary embodiment, SIT7757 (1,1,5,5-tetraphenyl-1,3,3,5 tetramethyl trisiloxane) was selected as a non-aqueous, insulating fluid medium to dope for increased conductivity. SIT7757 is a polydimethysiloxane fluid that has low ionic mobility, a low dielectric constant $\in = 2.7$, relatively high hydrophobicity, and does not dissolve or swell the PCLC flakes. SIT7757 is optically transparent, commercial available, environmentally friendly, inert, and low in cost. Table 1 lists some of the important characteristics of SIT7757 as well as that of a different fluid host, DMS E09 (polydimethylsiloxane, epoxypropoxypropyl terminated), that did not enable active reverse drive switching.

TABLE 1

| Host Fluid | $\eta_0$ [mP * s] at 25° C. | $\rho$ [kg/m$^3$] at 20° C. | n at 20° C. ($\lambda$ = 589.6 nm) | $\epsilon_h$ at 100 kHz* | $\sigma_h$ at 1 kHz [S/m]* | Supplier |
|---|---|---|---|---|---|---|
| SIT7757 | 35 | 1070 | 1.551 | 2.7 | 3 × 10$^{-8}$ | Geleste |
| DMS E09 | 9 | 995 | 1.446 | 7 | 9 × 10$^{-8}$ | Geleste |
| Propylene Carbonate | 2 | 1200 | 1.421 | 60 | 1 × 10$^{-4}$ | Acros Organics |

*measured with Solartron 1260, impedence gain/phase analyzer

A small amount of water was added to the insulating fluid host with a suitable surfactant to raise its conductivity.

Another way to increase the conductivity of a fluid is to dope in a salt that will dissociate to create charge carriers within the fluid. Water emulsified into a hydrophobic liquid with an appropriate anionic surfactant and sufficient mixing will form micelles with sizes dependent on the concentrations of the water and surfactant (a micelle is a loosely bound aggregation of several tens or hundreds of molecules that form a colloidal particle, which in turn is one of a number of ultramicroscopic particles dispersed through some continuous medium). A 0.25 to 2 wt % of Aerosol OT-100 (AOT) surfactant was successfully used to raise the conductivity of the SIT7757 fluid medium. A range of 0.0025 to 0.25 wt % of an inorganic chloride salt such as NaCl, KCl, LiCl or other chloride salts selected from Groups IA, IIA, IB, IIB, IIIB, IVB, VB VIB, VII and VIIB of the Periodic Table provide suitable doping salts. Table 2 includes data showing the conductivity increase due to incorporating water and salt water (5 wt. % NaCl) into two siloxane host fluids, SIT7757 and DMS-E09, using the surfactant Aerosol OT-100. The weight percentages used for the fluid, surfactant, and water or salt water solutions are also listed. Conductivity measurements were taken at 1 kHz with an impedance gain/phase analyzer and a sample thickness of ~500 µm.

TABLE 2

| Host Fluid | Host % | AOT-100 % | Water % | NaCl % | Conductivity (S/m) |
|---|---|---|---|---|---|
| SIT7757 | 100 | 0 | 0 | 0 | 1.04E−08 |
| SIT7757 | 98.5 | 1 | 0.375 | 0.125 | 3.28E−08 |
| SIT7757 | 98.5 | 1 | 0.45 | 0.05 | 2.37E−08 |
| SIT7757 | 98.5 | 1 | 0.475 | 0.025 | 2.51E−08 |
| SIT7757 | 98.5 | 1 | 0.495 | 0.005 | 3.85E−06 |
| SIT7757 | 98.5 | 1 | 0.5 | 0 | 3.18E−08 |
| SIT7757 | 96.5 | 1 | 2.375 | 0.125 | 7.54E−04 |
| SIT7757 | 96.5 | 1 | 2.5 | 0 | 9.81E−07 |
| SIT7757 | 94 | 1 | 4.75 | 0.25 | 7.54E−04 |
| SIT7757 | 94 | 1 | 5 | 0 | 1.17E−05 |
| DMS-E09 | 100 | 0 | 0 | 0 | 7.07E−07 |
| DMS-E09 | 98.5 | 1 | 0.375 | 0.125 | 4.43E−06 |
| DMS-E09 | 98.5 | 1 | 0.45 | 0.05 | 4.86E−06 |
| DMS-E09 | 98.5 | 1 | 0.475 | 0.025 | 8.00E−06 |
| DMS-E09 | 98.5 | 1 | 0.5 | 0 | 8.60E−06 |
| DMS-E09 | 97.5 | 1 | 1.425 | 0.075 | 8.19E−06 |
| DMS-E09 | 97.5 | 1 | 1.5 | 0 | 8.62E−06 |
| DMS-E09 | 96.5 | 1 | 2.375 | 0.125 | 1.12E−02 |
| DMS-E09 | 96.5 | 1 | 2.5 | 0 | 2.34E−05 |
| DMS-E09 | 94 | 1 | 4.75 | 0.25 | 1.08E−01 |
| DMS-E09 | 94 | 1 | 5 | 0 | 3.57E−05 |

Experimental Methods

Based upon the fluid parameters discussed above, four variations of doped polydimethylsiloxanes were tested:

1. NaCl dissolved into SIT7757 and DMS-E09;
2. NaCl and the surfactant AOT dissolved in SIT7757 and DMS-E09;
3. Water and the surfactant AOT emulsified into SIT7757 and DMS-E09;
4. Water and dissolved NaCl and the surfactant AOT emulsified into SIT775 and DMS-E09.

The first two variations were not successful; NaCl did not dissolve by itself or with AOT into either SIT7757 or DMS-E09 and were not explored further. The third and fourth variations mixed well and were measured for conductivity. They were prepared with undoped, commercial, freeze-fractured flakes mixed into the pure fluids before the other dopants were added. Approximately 1 g of each variant was prepared and used to make test cells. Each test cell had its dielectric properties measured and was characterized for E-O behavior with both applied AC and DC electric fields.

We observed a difference in the transparency at a macro level between the SIT7757 fluid variations: (1) 1% AOT and 0.5% water added, and (2) 1% AOT, 0.475% water and 0.025% NaCl added. After three days, the solution with 1% AOT, 0.475% water and NaCl (0.025%) added was more transparent than the fluid mixtures with any other ratio of dopants shown. In an AC or DC electric field, the PCLC flakes in E-O test cells made using SIT7757 as the host fluid and without the added salt did not reorient at low voltages (3-10 V), and the test cells shorted out at higher voltages. The exemplary formulation of SIT7757 doped with 0.475% water and 0.025% NaCl enabled the reverse drive mechanism described herein.

According to an exemplary embodiment, a reverse drive enabled suspension was comprised as follows:
  a fluid host that is a mixture of:
    94 to 99.5 wt % of a non-aqueous fluid medium having a dielectric constant value $\in$, where $1<\in<7$, a conductivity value $\sigma$, where $10^{-9}>\sigma>10^{-7}$ Siemens per meter (S/m), and a resistivity r, where $10^7>r>10^{10}$ ohm-meters (Ω-m), and which is optically transparent in a selected wavelength range $\Delta\lambda$;
    0.0025 to 0.25 wt % of an inorganic chloride salt;
    0.0475 to 4.75 wt % water; and
    0.25 to 2 wt % of an anionic surfactant; and
  1 to 5 wt % of PCLC flakes suspended in the fluid host mixture.

According to a particular aspect, the reverse drive enabled suspension was comprised as follows:
  a fluid host that is a mixture of:
    98.5 wt % of SIT7757 fluid;
    0.025 wt % inorganic chloride salt;
    0.475 wt % water; and
    1 wt % aerosol-OT surfactant; and
  1 to 5 wt % of PCLC flakes suspended in the fluid host mixture.

Electro-Optic Behavior in a DC Electric Field

Figure 3:
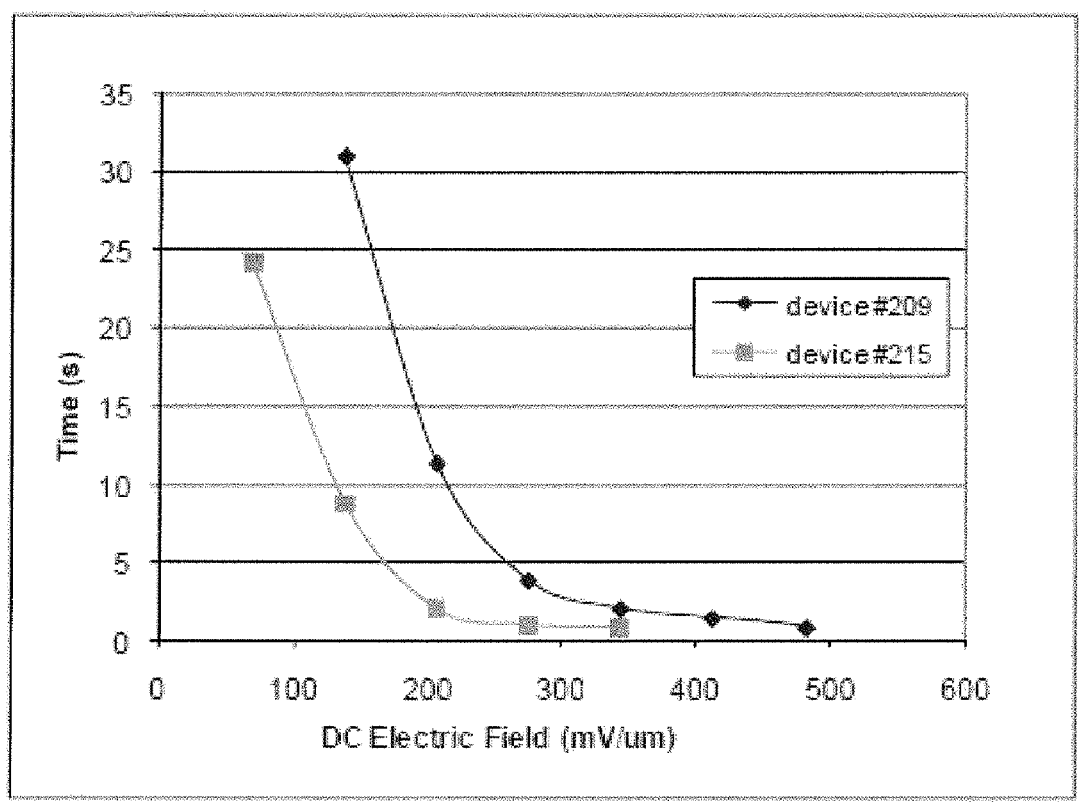
FIG. 3 shows a plot of reorientation times in a Basic type test cell as a function of DC electric field magnitude for PCLC flakes in doped SIT7757 host fluid (1% AOT, 0.475% water, 0.025% NaCl). A log-log plot of the reorientation time versus electric field strength shows a dramatic reduction in response time with increasing field strength, according to an illustrative aspect of the invention.

In SIT7757 doped with AOT, water and NaCl as described above, the PCLC flakes were observed to reorient parallel to the electric field in both AC and DC electric fields. A plot of the reorientation times as a function of test cell (described in more detail below) voltage in a DC electric field is shown in FIG. 3 for a Basic test cell configuration with a gap of ~150 µm. The data show that the PCLC flakes will reorient with an electric field as low as 69 mV/µm and reach a minimum reorientation time in <1 s at an electric field of 275 mV/µm.

Two Microcube test cells were also assembled to explore the effect of insulating the electrodes from the host fluid. In the DC regime, the Microcube encapsulated flakes reoriented as in the Basic cell type, but a much higher voltage (~667 mV/µm) was required to align flakes with the electric field. The observed high electric field penetration indicates that conductivity plays a roll in the E-O behavior in the Basic type cell even though the conductivity of the doped host fluid is still very low. Also, the fact that reorientation occurred in the Microcube test cells indicates that the difference in dielectric constants between the PCLC flake and host fluid has been increased by doping of the host fluid, even though it was not possible to measure a change in dielectric constant using impedance measurements.

Electro-Optic Behavior in an AC Electric Field

In an AC electric field, MW reorientation of PCLC flakes into a parallel alignment with the electric field was observed at low frequencies (~<40 Hz). While the E-O behavior of the PCLC flakes in doped SIT7757 at low frequencies is believed to be unique and novel, as the frequency is increased above 40 Hz, a key observation was made: at frequencies of 40 Hz and greater, the PCLC flakes are driven to reorient (relax) back to their reflective state. The flakes now align themselves perpendicular to the electric field. This bidirectional frequency dependent behavior demonstrates the on/off switching needed to move this technology forward to commercial viability for reflective particle displays; i.e., "color off" at low drive frequencies and "color on" at high drive frequencies.

Figure 4:
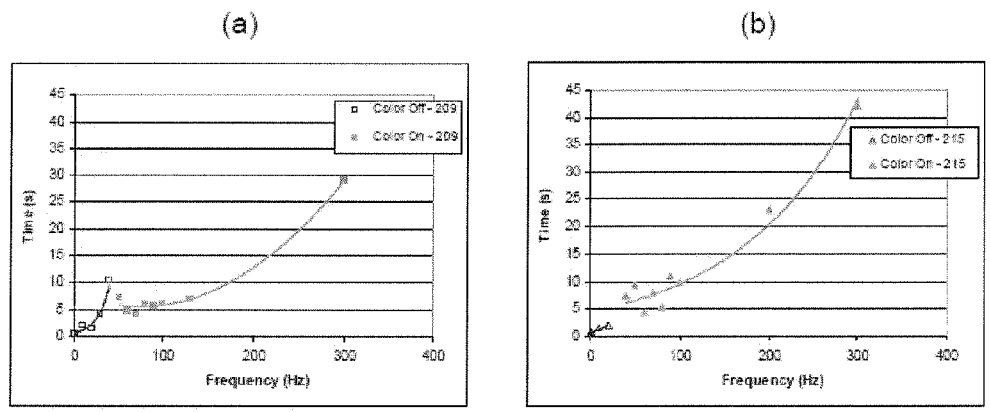
FIGS. 4(a, b) show plots of AC reorientation (color OFF) and reversal/relaxation (color ON) times as a function of frequency for PCLC flakes in a SIT7757 host fluid doped with 1% AOT, 0.475% H2O, and 0.025% NaCl, within a Basic test cell, showing (a) the flakes aligned parallel with the electric field at <40 Hz and the flakes aligned perpendicular with the electric field at >50 Hz; (b) the flakes aligned parallel with the electric field at <20 Hz and the flakes align perpendicular with the electric field at >40 Hz, according to an illustrative embodiment of the invention.

Plots of the reorientation times above and below the turnover frequency are shown in FIG. 4 for a Basic test cell with a gap of 150 μm and an electric field of 233 mV/μm. For the test cell #209 shown in FIG. 4(a), the flakes align parallel with the electric field at <40 Hz and the flakes align perpendicular to the electric field at >50 Hz. For the test cell #215 shown in FIG. 4(b), the flakes align parallel with the electric field at <20 Hz and the flakes align perpendicular to the electric field at >40 Hz.

Figure 5:
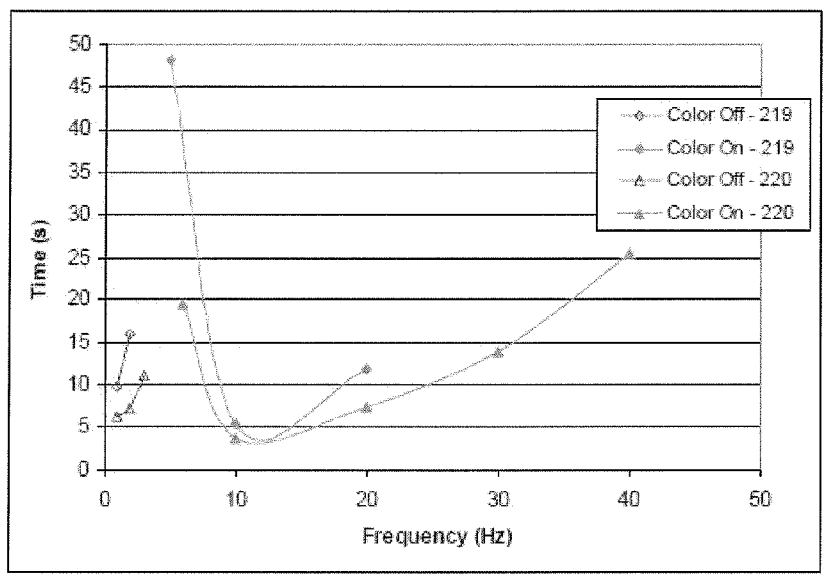
FIG. 5 shows a plot of AC reorientation (color off) and reversal (color on) times for a Microcube test cell as a function of frequency for PCLC flakes in a SIT7757 host fluid doped with 1% AOT, 0.475% H2O, and 0.025% NaCl. The turnover frequency is lower than for a Basic test cell type as shown in FIGS. 4(a, b) and the reorientation times are slower. The turnover frequency is ~5 Hz, according to an illustrative aspect of the invention.

Two Microcube test cells were also tested in AC fields to explore the effect of insulating the electrodes from the host fluid. A plot of the 'color on" and "color off" reorientation times can be seen in FIG. 5. The test cells were still functional but reoriented more slowly than in the Basic type test cells and had a lower turnover frequency (~5 Hz). The reorientation times only reached a minimum of ~4 s at a slightly higher electric field of 267 mV/μm than the Basic test cell configuration. Also seen in the plot of FIG. 5, the increase in the reorientation time for the color-ON state is more pronounced than for the Basic cell configuration in FIG. 4. This increased reorientation time before decreasing to the minimum value of ~4 s is likely due to the much narrower range of frequencies measured in the Microcube test cells. If added measurements were taken for the Basic type test cells near the turnover frequency, from 40 Hz to 50 Hz for FIG. 4(a) and from 20 Hz to 40 Hz for FIG. 4(b), a similar increase in reorientation times would be expected on either side of the turnover frequency.

Test Cell Aging

Figure 6:
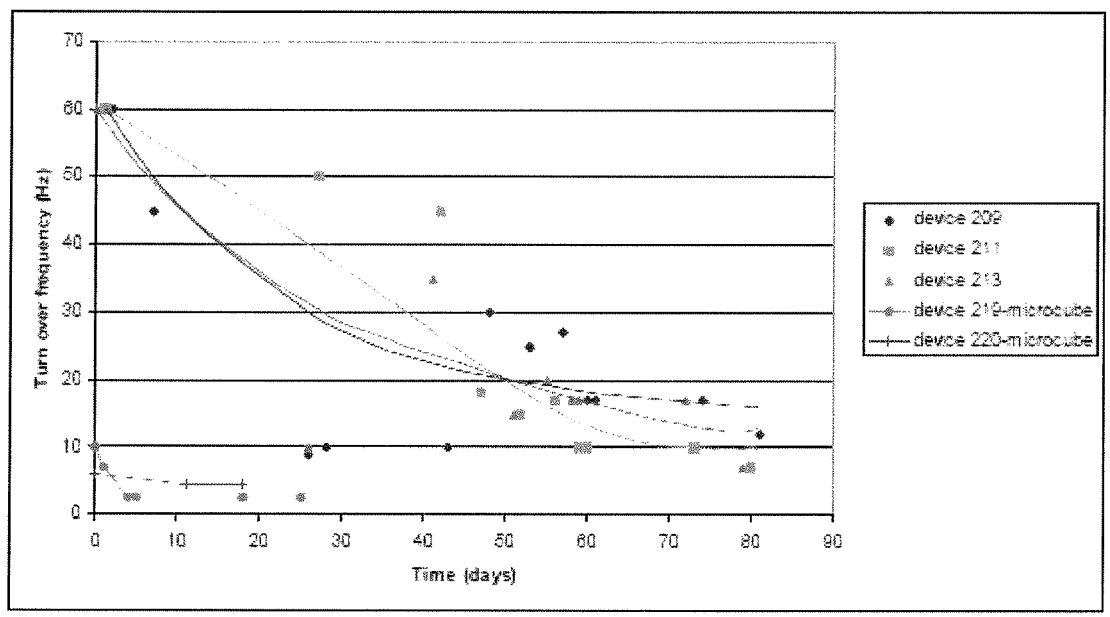
FIG. 6 is a plot that showing that the turnover frequency decreases as the age of the test cell increases, according to an illustrative aspect of the invention. Data is shown for Basic and Microcube type test cells with doped SIT7757 host fluid and commercial freeze-fractured PCLC flakes with an AC electric field applied. Lines are drawn to guide the eye.

As the age of the test cell increased, the turnover frequency decreased and then appeared to level out as shown in FIG. 6. Data is shown for Basic and Microcube type test cells with doped SIT7757 host fluid and commercial freeze-fractured PCLC flakes with an AC electric field applied. The lines shown are drawn to guide the eye. Drive voltage variations were required for cell tests due to variations in test cell dimensions and dielectric properties. Devices 209, 211 and 213 had an electric field of ~276 mVrms/μm applied. Device 219 had an electric field of ~250 mVrms/μm applied and device 220 had ~286 mVrms/μm applied. Initially the turnover frequency was 60 Hz for the Basic type test cells. After ~60 days the turnover frequency was observed to be closer to 10 Hz for the Basic type test cells. The Microcube test cells started much lower, at 10 Hz, and then leveled out to ~3 Hz after ~7 days. All of the test cells prepared with doped SIT7757 continued to exhibit on-off switching behavior for the entire 80 day life testing. This material system is very robust due to the stability of siloxane fluids.

As stated above, higher drive currents for switchable particle displays are not desirable. The low dielectric constant host fluid SIT7757, when doped, has much lower drive currents for functional devices than do other host materials that were investigated. The test cells and their measured drive currents are given in Table 3. These values are exceedingly small when compared to those required for switching of a typical PC Basic type test cell used in this work (e.g., 10E4 μA) but comparable to a typical Liquid Crystal Display (e.g., $2.5 \times 10-3$ μA/mm$^2$) of the same active area.

TABLE 3

| Cell # | Cell type | Cell gap (μm) | $V_{rms}$ | R (ohms) | Current (A) | Current (μA/mm$^2$) |
|---|---|---|---|---|---|---|
| 209 | Basic | 145 | 40 | 2.34E+08 | 1.71E−07 | 2.74E−04 |
| 211 | Basic | 145 | 40 | 8.52E+08 | 4.69E−08 | 7.51E−05 |
| 213 | Basic | 145 | 40 | 2.50E+08 | 1.60E−07 | 2.56E−04 |
| 215 | Basic | 155 | 40 | 1.82E+08 | 2.20E−07 | 3.52E−04 |
| 216 | Basic | 245 | 40 | 2.22E+08 | 1.80E−07 | 2.88E−04 |
| 219 | Microcube | 160 | 40 | 1.60E+08 | 2.50E−07 | 1.48E−03 |
| 220 | Microcube | 140 | 40 | 3.66E+09 | 1.09E−08 | 6.47E−05 |

Test Cell Configurations and Encapsulation Forms and Methods

As referred to herein above, testing of the flake/fluid suspension as well as the effective use of the flake/fluid suspension in a display or other optical device application requires the encapsulation of the suspension.

Microencapsulation can take many different forms depending on the materials used and the desired end results. Six exemplary variations of microencapsulation were selected to show the effect of increasing complexity in boundary conditions on the electric field acting on the PCLC flake. The configurations were selected because of their similarity to commercially used microencapsulation methods applied to particle display applications.

Figure 7:
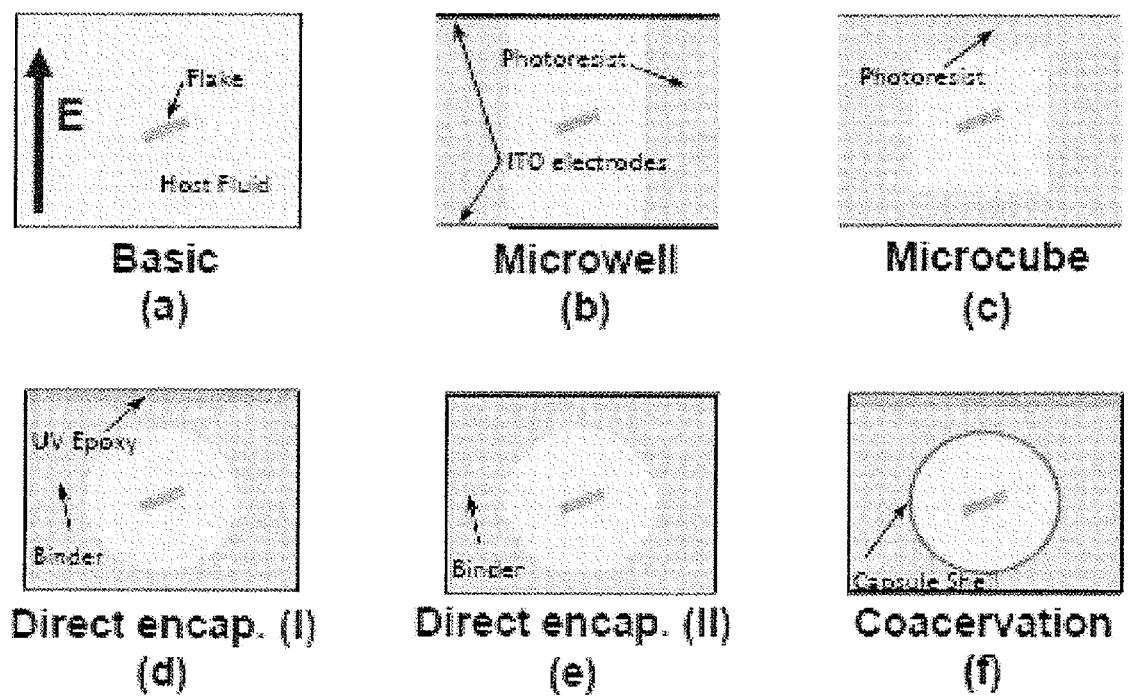
FIGS. 7(a-f) schematically show six configurations of PCLC flake test cells studied: (a) Basic test cell, (b) Microwell, (c) Microcube, (d) Direct encapsulation (I), e) Direct encapsulation (II), (f) Coacervation encapsulation, according to illustrative aspects of the invention.

The six exemplary configurations studied are illustrated in FIGS. 7(a-f). A Basic cell, FIG. 7(a), having only a flake/host fluid suspension in the cell gap is used as a baseline encapsulation cell. A Microwell cell, FIG. 7(b), adds vertical walls (photoresist) to the cell gap to constrain the flake/host fluid suspension. The fluid is in contact with the electrodes as in the Basic cell and the electric field experiences a continuous material path between the electrodes, except for the PCLC flake. A Microcube cell, FIG. 7(c), is very similar to the Microwell configuration but has an added layer of photoresist above and below the host fluid creating a discontinuous path for the electric field between the electrodes. For Direct encapsulation cells two methods of assembly are shown: Direct encapsulation type (I), FIG. 7(d), has the flake/host fluid constrained in a capsule. The path for the electric field is both discontinuous and non-uniform, as the curved edges of the capsule are along the path between the electrodes. This configuration also includes a layer of epoxy adhesive used for assembly between the binder layer and the top electrode. The binder layer is the bulk material that the capsules are dispersed in and is in contact with at least one electrode. Direct encapsulation type (II), FIG. 7(e) also has the flake/host fluid constrained in a capsule similar to (I) except there is no adhesive layer between the binder layer and top electrode. A Coacervation cell, FIG. 7(f), represents a device that, once assembled, is very similar in appearance to the Direct encapsulation devices, with one important exception: there is an additional discontinuous material forming a separate capsule shell that further complicates the path of the electric field.

Figure 8:
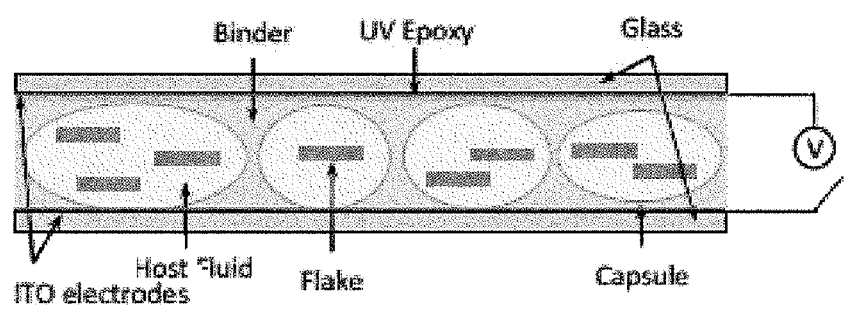
FIGS. 8(a-c) schematically illustrate (a) a cross-section of a Coacervation encapsulation test cell, (b) a view of (a) with fluid, flake, capsule, UV epoxy and polymer binder boundaries in the cell gap, and (c) a finite element model of the Coacervation encapsulation test cell cross-section in (b) generated in Comsol Multiphysics, according to illustrative aspects of the invention.
Figure 8:
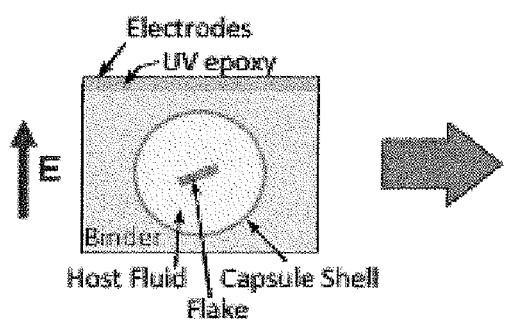
Figure 8:
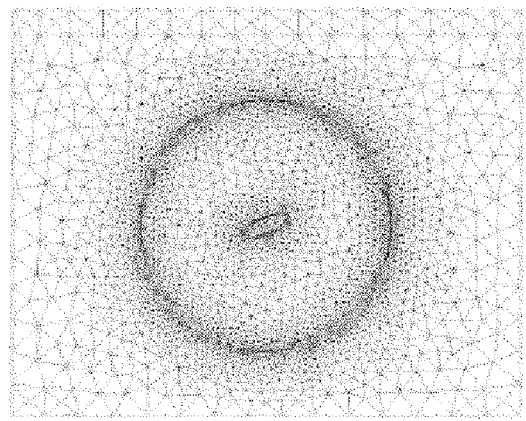
Figure 9:
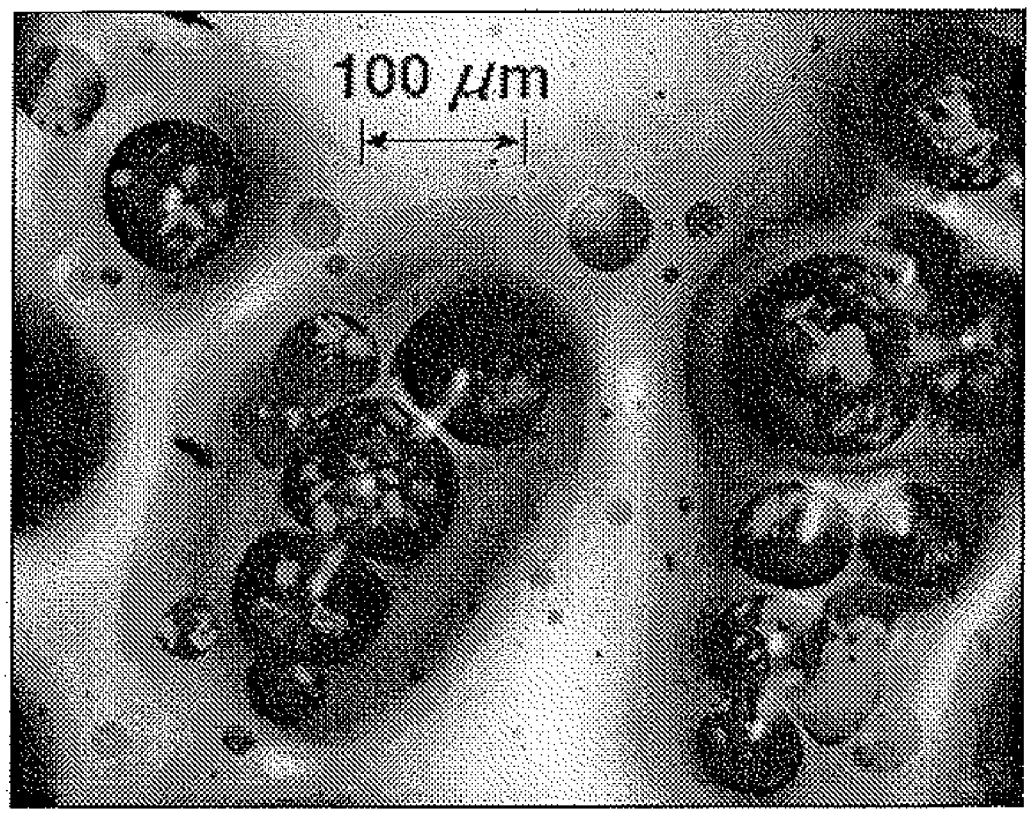
FIG. 9 is a photomicrograph showing the PCLC flake/fluid suspension in gelatin microcapsules (gelcaps) referred to as complex coacervation encapsulation, according to an illustrative aspect of the invention.
Figure 10:
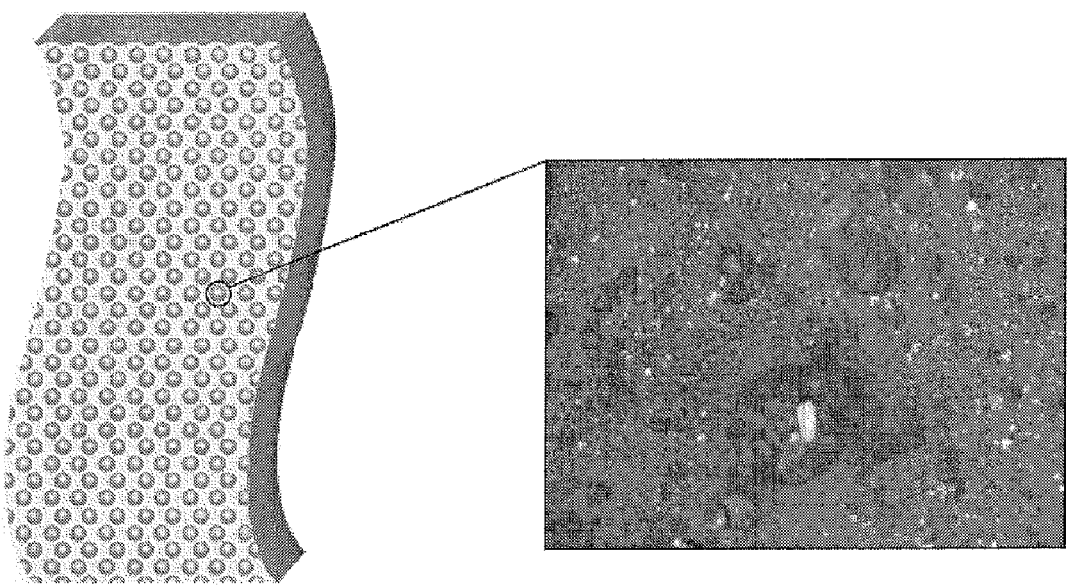
FIG. 10 schematically illustrates PCLC gelcaps in a flexible PVA binder, according to an illustrative aspect of the invention.

The different encapsulation types are intended to show an evolution of complexity in moving from a test cell with only a flake/host fluid suspension in an applied electric field, to a flake/host fluid suspension microencapsulated within discrete gelatin capsules (see also FIG. 9). FIG. 8(a) illustrates a Coacervation encapsulation type test cell used for electro-optic characterization; the capsules have been dispersed into a separate film-forming polymer binder (see also FIG. 10), coated onto an ITO electrode coated substrate and then attached to a second substrate with a UV cured adhesive. The capsules depicted schematically in FIG. 8(a) have multiple flakes and oval capsules.

In reality the capsules have a size distribution and many have multiple flakes. The capsules may also become oval as the binder shrinks during curing. FIG. 8(b) represents the 2-D cross-section of the cell to be modeled. FIG. 8(c) is the matching finite element mesh generated within Comsol Multiphysics using the "In-Plane Electric Currents" module to analyze the electric field.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. No language in the specification should be construed as indicating any non-claimed element as essential to the practice of the invention.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A suspension, comprising:
    a fluid host that is a mixture of:
        94 to 99.5 wt % of a non-aqueous fluid medium having a dielectric constant value $\in$, where $1<\in<7$, a conductivity value σ, where $10^{-9}>\sigma>10^{-7}$ Siemens per meter (S/m), and a resistivity r, where $10^{7}>r>10^{10}$ ohm-meters (Ω-m), and which is optically transparent in a selected wavelength range Δλ;
        0.0025 to 0.25 wt % of an inorganic chloride salt;
        0.0475 to 4.75 wt % water; and
        0.25 to 2 wt % of an anionic surfactant; and
    1 to 5 wt % of PCLC flakes suspended in the fluid host mixture.

2. The suspension of claim 1, wherein the non-aqueous fluid medium is a silicone oil.

3. The suspension of claim 1, wherein the fluid host is transparent in a selected visible wavelength range.

4. The suspension of claim 1, wherein the fluid host is transparent in a selected infra-red wavelength range.

5. The suspension of claim 1, wherein the chloride salt is dissolved in distilled or deionized water.

6. The suspension of claim 1, wherein the chloride salt is selected from a group consisting of NaCl, KCl, LiCl and other chloride salts selected from Groups IA, IIA, IB, IIB, IIIB, IVB, VB VIB, VII and VIIB of the Periodic table of the elements.

7. The suspension of claim 1, wherein the PCLC flakes have a top surface and a bottom surface, which are each characterized by a surface dimension aspect ratio of at least 1:1, further wherein each flake has a thickness between about two microns to 10 microns.

8. The suspension of claim 1, wherein the PCLC flakes have at least one of a regular and an irregular surface geometry.

9. The suspension of claim 1, wherein the PCLC flakes are pure, undoped PCLC flakes.

10. The solution of claim 1, wherein the PCLC flakes are doped such that they are characterized by a dielectric constant value $\in$, where $1<\in<7$ and a conductivity value σ, where $10^{-9}>\sigma>10^{-7}$ Siemens per meter.

11. The suspension of claim 1, wherein at least some of the PCLC flakes are layered flakes comprising two flakes disposed in opposing surface contact.

12. The suspension of claim 11, wherein the layered PCLC flakes include an intermediate optical stop layer.

13. The suspension of claim 11, wherein one of the layered flakes is left-hand circularly polarized and the other of the layered flakes is right-hand circularly polarized.

14. The suspension of claim 11 wherein the layered flakes comprise two flakes having the same circular polarization handedness, layered on opposing sides of a half-wave-plate medium.

15. The suspension of claim 1, wherein the fluid host is a mixture of:
    98.5 wt % of a phenyl-substituted polydimethylsiloxane fluid;
    0.025 wt % inorganic chloride salt;
    0.475 wt % water; and
    1 wt % aerosol-OT surfactant.

16. The suspension of claim 15, wherein the inorganic chloride salt is NaCl.

17. A polymer cholesteric liquid crystal (PCLC)-based system, comprising:
    the suspension of claim 1; and
    a discrete, optically transparent polymer binder in which the suspension is totally encapsulated.

18. The system of claim 17, wherein the polymer binder is a discrete shell or capsule.

19. The system of claim 18, further comprising a polymer film-forming binder, wherein the discrete shells or capsules are dispersed therein.

20. The system of claim 18, further comprising an enclosure having two opposing surfaces wherein at least one of the surfaces is optically transparent over a selected wavelength range, further wherein the shell or capsule is disposed between the surfaces.

21. The system of claim 19, further comprising an enclosure having two opposing surfaces wherein at least one of the surfaces is optically transparent over a selected wavelength range, further wherein the shell or capsule is disposed between the surfaces.

22. The system of claim 20, further wherein the enclosure surfaces have an electrically conductive coating.

23. The system of claim 21, further wherein the enclosure surfaces have an electrically conductive coating.

24. The system of claim 23, further comprising an epoxy layer intermediate the binder and at least one of the electrically-conductively-coated surfaces.

25. The system of claim 18, wherein the system is an electronic particle display device.

26. The system of claim 19, wherein the system is an electronic particle display device.

27. The system of claim 18, wherein the shell or capsule has a wall that is composed of a gelatin medium.

28. A polymer cholesteric liquid crystal (PCLC)-based system, comprising:
an enclosure having two opposing surfaces wherein at least one of the surfaces is optically transparent over a selected wavelength range;
a suspension disposed in the enclosure, wherein the suspension comprises a fluid host that is a mixture of:
94 to 99.5 wt % of a non-aqueous fluid medium having a dielectric constant value $\in$, where $1<\in<7$, a conductivity value $\sigma$, where $10^{-9}>\sigma>10^{-7}$ Siemens per meter (S/m), and a resistivity r, where $10^{7}>r>10^{10}$ ohm-meters ($\Omega$-m), and which is optically transparent in the selected wavelength range;
0.0025 to 0.25 wt % of an inorganic chloride salt dissolved in water; and
0.25 to 2 wt % of an anionic surfactant; and
1 to 5 wt % of PCLC flakes suspended in the fluid host mixture.

29. The system of claim 28, wherein the enclosure surfaces have an electrically conductive coating in contact with the suspension, further comprising a frequency modulated voltage source connected to the conductive coating.

30. The system of claim 28, wherein the enclosure has a gap thickness that is sufficient to accommodate an at least partially-rotated PCLC flake.

31. The system of claim 28, wherein the enclosure has a gap thickness between about 50 to 250 microns.

32. The system of claim 28, wherein the enclosure surfaces are flexible.

33. The system of claim 28, wherein the enclosure is a polymer film, further wherein the suspension is in an emulsified form encapsulated therein.

34. The suspension of claim 28, wherein the non-aqueous fluid medium is a silicone oil.

35. The suspension of claim 28, wherein the fluid host is transparent in a selected visible wavelength range.

36. The suspension of claim 28, wherein the fluid host is transparent in a selected infra-red wavelength range.

37. The suspension of claim 28, wherein the chloride salt is dissolved in distilled or deionized water.

38. The suspension of claim 28, wherein the chloride salt is selected from a group consisting of NaCl, KCl, LiCl and other chloride salts selected from Groups IA, IIA, IB, IIB, IIIB, IVB, VB VIB, VII and VIIB of the Periodic table of the elements.

39. The suspension of claim 28, wherein the PCLC flakes have a top surface and a bottom surface, which are each characterized by a surface dimension aspect ratio of at least 1:1, further wherein each flake has a thickness between about two microns to 10 microns.

40. The suspension of claim 28, wherein the PCLC flakes have at least one of a regular and an irregular surface geometry.

41. The suspension of claim 28, wherein the PCLC flakes are pure, undoped PCLC flakes.

42. The solution of claim 28, wherein the PCLC flakes are doped such that they are characterized by a dielectric constant value $\in$, where $1<\in<7$ and a conductivity value $\sigma$, where $10^{-9}>\sigma>10^{-7}$ Siemens per meter.

43. The suspension of claim 28, wherein at least some of the PCLC flakes are layered flakes comprising two flakes disposed in opposing surface contact.

44. The suspension of claim 43, wherein the layered PCLC flakes include an intermediate optical stop layer.

45. The suspension of claim 43, wherein one of the layered flakes is left-hand circularly polarized and the other of the layered flakes is right-hand circularly polarized.

46. The suspension of claim 43 wherein the layered flakes comprise two flakes having the same circular polarization handedness, layered on opposing sides of a half-wave-plate medium.

47. The suspension of claim 28, wherein the fluid host is a mixture of:
98.5 wt % of a phenyl-substituted polydimethylsiloxane fluid;
0.025 wt % inorganic chloride salt;
0.475 wt % water; and
1 wt % aerosol-OT surfactant.

48. The suspension of claim 47, wherein the inorganic chloride salt is NaCl.

49. A method for driving a PCLC flake in at least two opposite directions, comprising:
applying an AC voltage at a first frequency to a flake/host fluid suspension disposed in an enclosure, wherein the suspension further comprises a fluid host that is a mixture of:
94 to 99.5 wt % of a non-aqueous fluid medium having a dielectric constant value $\in$, where $1<\in<7$, a conductivity value $\sigma$, where $10^{-9}>\sigma>10^{-7}$ Siemens per meter (S/m), and a resistivity r, where $10^{7}>r>10^{10}$ ohm-meters ($\Omega$-m), and which is optically transparent in a selected wavelength range $\Delta\lambda$;
0.0025 to 0.25 wt % of an inorganic chloride salt;
0.0475 to 4.75 wt % water; and
0.25 to 2 wt % of an anionic surfactant; and
1 to 5 wt % of PCLC flakes suspended in the fluid host mixture, to rotate the PCLC flakes in a first direction and thus orient the PCLC flakes in a first orientation that is different than an initial, unrotated orientation; and
applying an AC voltage at a second frequency to the solution to rotate the PCLC flakes in a second direction that is opposite to the first direction and thus orient the PCLC flakes in a second orientation that is different than the first orientation.

50. The method of claim 49, wherein the second orientation is the initial orientation.

51. The method of claim 49, wherein the AC voltage is in the range of between about 50 millivolts per micron (mV/$\mu$) of a specified enclosure dimension to about 350 mV/$\mu$.

52. The method of claim 51, wherein the frequency is in the range of between 0.1 to 300 cycles per second (Hz).

53. The method of claim 52, comprising applying an AC voltage in the range of between about 50 mV/$\mu$ to about 350 mV/$\mu$ at equal to or less than 5 Hz.

54. The method of claim 52, comprising applying an AC voltage in the range of between about 50 mV/$\mu$ to about 350 mV/$\mu$ at equal to or greater than 40 Hz.

* * * * *